United States Patent [19]

Reiter, Jr. et al.

[11] Patent Number: 5,191,256

[45] Date of Patent: Mar. 2, 1993

[54] INTERIOR MAGNET ROTARY MACHINE

[75] Inventors: Frederick B. Reiter, Jr.; Brad C. Koelblinger, both of Fairfield, Iowa; Daniel W. McGee, Ventura, Calif.; Vamaraju S. R. Murthy, St. Louis, Mo.; John S. Draper, Fairfield, Iowa

[73] Assignee: American Motion Systems, Fairfield, Iowa

[21] Appl. No.: 452,301

[22] Filed: Dec. 15, 1989

[51] Int. Cl.⁵ .......................................... H02K 21/12
[52] U.S. Cl. .................................. 310/156; 310/216; 310/218; 310/261
[58] Field of Search ............... 310/261, 156, 262, 264, 310/265, 267, 269, 254, 216, 218

[56] References Cited

U.S. PATENT DOCUMENTS

| 1,543,347 | 6/1925 | Turner | 310/156 |
|---|---|---|---|
| 2,062,938 | 12/1936 | Ruppe | 310/218 UX |
| 3,014,142 | 12/1961 | Lee | 310/218 UX |
| 4,434,546 | 3/1984 | Hershberger | 310/216 |
| 4,486,678 | 12/1984 | Olson | 310/156 |
| 4,588,914 | 5/1986 | Heyne | 310/156 |
| 4,658,167 | 4/1987 | Popov | 310/156 |
| 4,700,097 | 10/1987 | Kawada et al. | 310/156 |
| 4,725,750 | 2/1988 | Welch | 310/156 |
| 4,845,837 | 7/1989 | Lloyd | 310/216 |
| 4,954,736 | 9/1990 | Kawamoto | 310/156 |

FOREIGN PATENT DOCUMENTS

| 0338610 | 10/1989 | European Pat. Off. | |
| 2621301 | 5/1976 | Fed. Rep. of Germany . | |
| 1511999 | 12/1967 | France . | |
| 1533121 | 6/1968 | France . | |
| 2264418 | 3/1974 | France . | |
| 0274653 | 2/1989 | Japan | 310/156 |
| 0172121 | 12/1933 | Switzerland | 310/156 |
| 0416389 | 1/1967 | Switzerland | 310/156 |
| 0292135 | 9/1928 | United Kingdom . | |
| 0455231 | 10/1936 | United Kingdom | 310/156 |
| 0917209 | 1/1963 | United Kingdom . | |

OTHER PUBLICATIONS

IBM Technical Disclosure Bulletin; Square-Wave Generator; A. J. Lavin et al.; vol. 4, No. 9, p. 17; Feb. 1962.
Patent Abstracts of Japan, vol. 2, No. 141, (E-78) (8861), Nov. 11, 1978.
International Search Report and Annex thereto; Int'l Appl. No. PCT/US 90/07322; May 17, 1991.

Primary Examiner—R. Skudy
Attorney, Agent, or Firm—Bell, Seltzer, Park & Gibson

[57] ABSTRACT

A rotor for an interior magnet rotary machine, such as motors and generators, is mass produced by forming an elongated structure. This structure has channels in the periphery thereof which are parallel to the longitudinal axis of the structure. The elongated structure is cut into rotor frames of a predetermined length having channels extending from one end to the opposite end thereof. Magnets are placed in the channels. Pole pieces may be placed on the magnets in the channels.

The interior magnet rotary machine produced by this method has a rotor of a structure made of a rotor frame with channels extending from one end to the opposite end, and at least one magnet in a respective one of the channels. Thus, an efficient, low cost, mass producible, and easily assembled rotor for an interior magnet rotary machine is provided.

44 Claims, 3 Drawing Sheets

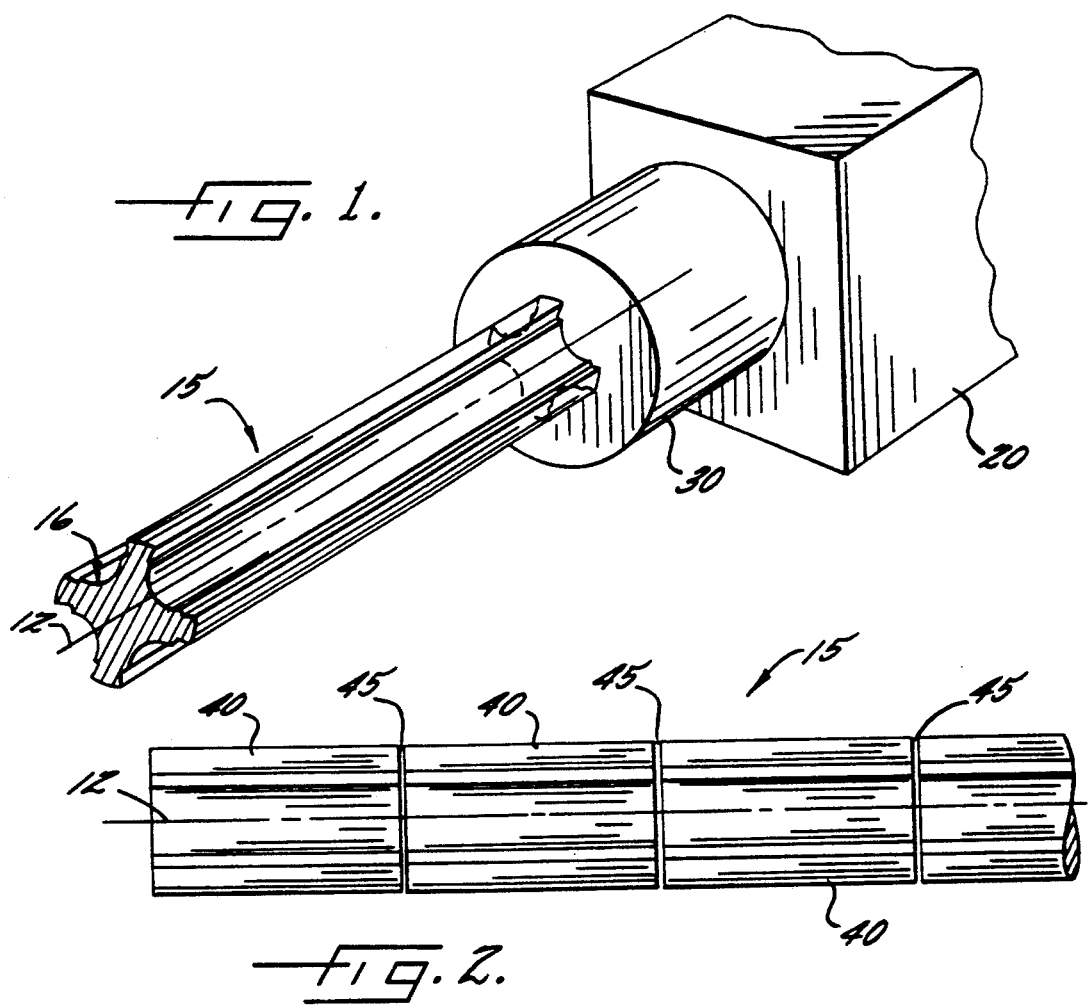
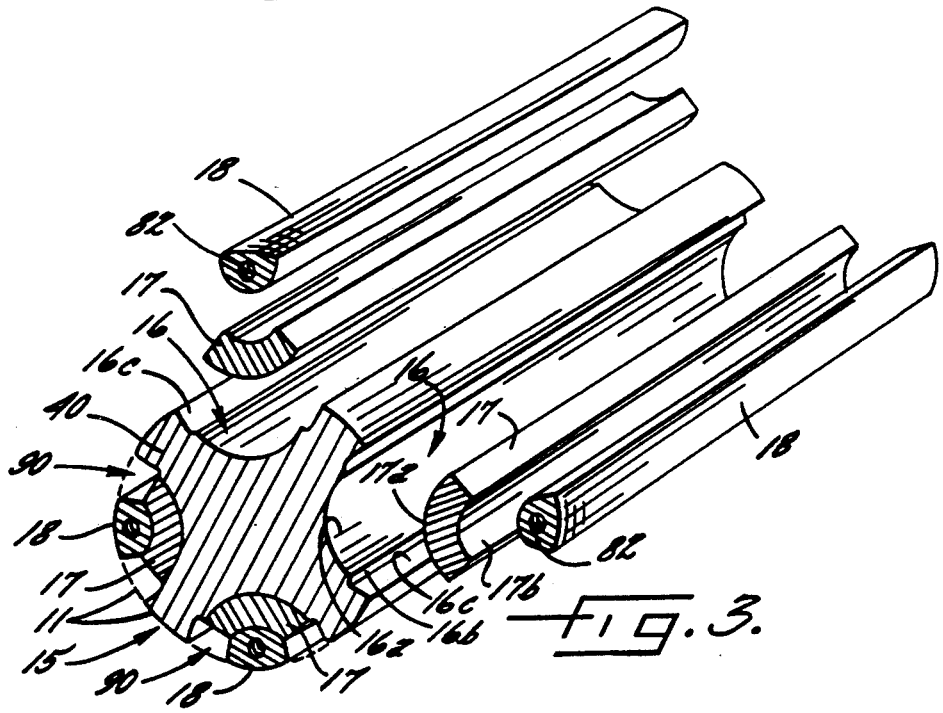

INTERIOR MAGNET ROTARY MACHINE

FIELD OF THE INVENTION

This invention relates to rotary machines such as motors and generators, and more particularly to an interior magnet rotary machine.

BACKGROUND OF THE INVENTION

Interior magnet rotary machines are well known in the art and include interior magnet motors and generators. Interior magnet rotary machines are a type of permanent magnet rotary machines and generally comprise a rotor having magnets built inside it. Examples of interior magnet machines may be found in U.S. Pat. Nos. 4,700,097 and 4,486,678.

Interior magnet machines have been widely investigated because their unique rotor structure combines synchronous and induction characteristics in a solid rotor that utilizes permanent magnets. Interior magnet machines may be used in different environments, with alternating current or direct current, and they provide a generally constant torque output throughout their speed range, which can include very high speeds due to the interior magnet rotor construction. Interior magnet machines are also preferred because of their contactless two-dimensional (perpendicular to the rotor axis) flux path between the rotor and stator.

Prior to the development of interior magnet machines, rotary machines were characterized by electrical windings on a rotor, the use of slip rings or brushes to accommodate the rotation of the windings or to commutate the flow of electricity, and the maintenance of a rotating electrical connection. This type of prior machine requires the rotor to be in electrical contact with the stator. Thus, slip rings and brushes are necessary even though they degrade operational efficiency through power loss from the electrical resistance of the brush contact, and through mechanical friction loss due to the drag of the brushes on the rotor. The windings on the rotor also significantly increase the mass of the rotor, necessitating slower rotational speeds or more energy from a prime mover. Moreover, the constant rotation, heating, and magnetic forces exerted on the coils and their insulation cause them to fatigue, crack, degrade, and ultimately fail with time.

The interior magnet machine solves these problems by mounting permanent magnets, rather than electromagnets, on the rotor. This eliminates the need for rotating electrical connections, saves the electrical power otherwise expended in exciting the field, lessens the amount of internal heat generation, and increases power density.

Notwithstanding the above advantages, interior magnet machines have not been widely used because a viable method for mass producing an interior magnet machine at low cost has heretofore not been available. See for example, U.S. Pat. No. 4,725,750, which describes an internal magnet rotor having a frame including a group of trough-shaped openings around the periphery thereof, extending parallel to the axis of the rotor frame, within the central portion thereof. A corresponding trough-shaped permanent magnet is inserted in each rotor frame opening.

Unfortunately, the rotor of the aforesaid U.S. Pat. No. 4,725,750 is difficult to efficiently mass produce because of the need to provide trough-shaped openings in the central portion of the rotor. In particular, the rotor frames must be made one at a time by a molding operation, or each trough-shaped opening must be individually cut from the central portion of the rotor frame. Molding or cutting are inherently slow and expensive, and as such, these rotors cannot be efficiently mass produced.

Moreover, besides being inefficient from a mass production standpoint, the machine described in the aforesaid U.S. Pat. No. 4,725,750 is inefficient, because of the flux leakage paths that are associated with the trough-shaped centrally located magnets. As is well known to those having skill in the art, flux leakage causes hysteresis loss, eddy current loss, heat production, and magnetic paths that operate at less than full saturation, resulting in low energy density and an increase in bulk and weight. Furthermore, it is very difficult, if not impossible, to uniformly magnetize these trough-shaped magnets, particularly at their respective ends.

SUMMARY OF THE INVENTION

It is therefore an object of the invention to provide an improved interior magnet rotary machine.

It is another object of the invention to provide an improved method of making an interior magnet rotary machine.

It is yet another object of the invention to provide an efficient, low cost, mass producible interior magnet rotary machine.

It is still a further object of the invention to provide an interior magnet rotary machine which does not require individual molding of trough-shaped openings in the central portion of the rotor frame for accepting correspondingly shaped permanent magnets.

It is still another object of the invention to provide an interior magnet rotary machine which does not require individual cutting of trough-shaped openings in the central portion of the rotor frame for accepting correspondingly shaped permanent magnets.

It is yet a further object of the invention to provide an interior magnet rotary machine which minimizes flux leakage, hysteresis loss, eddy current loss, and heat production.

It is yet a still further object of the invention to provide an interior magnet rotary machine which uses low cost, mass producible magnets which may be magnetized uniformly.

These and other objects and advantages of the present invention are provided by a method for making a rotor by forming an elongated structure having channels in the periphery thereof, and extending parallel to the longitudinal axis of the structure. The elongated structure is cut into individual rotor frames of a predetermined length having the channels extending from one end to the opposite end thereof. Magnets are placed in the channels. Pole pieces may be placed on the magnets in the channels. The channels, pole pieces, and magnets may be U-shaped, V-shaped, or other shapes. The inner face of a magnet may conform to the surface of a channel, and a pole piece may conform to the outer face of a magnet.

It will be seen that the method of the present invention allows one to continuously form, preferably by extrusion, large numbers of rotors with channels already built in from one end to the opposite end. Individual troughs do not have to be individually molded or cut from the central portions of the rotor frames. Conventional extrusion and cutting tools may be employed to form the rotors. Accordingly, a low cost, mass producible rotor is provided.

By practicing the method of the present invention, an interior magnet machine is produced with an efficient rotor structure. Particularly, this rotor structure has a rotor frame with channels extending from one end to the opposite end of the rotor frame. Each channel may include one or more magnets of different shapes therein.

By providing channels and magnets which extend from one end of the rotor frame to the opposite end, and not merely in the central portion of the rotor frame, the rotor of the present invention efficiently routes the flux to avoid undesirable flux leakage and to accomplish a very high energy density. There is virtually no hysteresis or eddy current loss and heating is greatly reduced. Substantially all the magnetically permeable paths are fully saturated at all times, reducing the amount of iron, bulk, and weight, and increasing the horsepower to weight ratio.

BRIEF DESCRIPTION OF THE DRAWINGS

Some of the features and advantages of the invention having been stated, others will appear as the description proceeds, when taken in connection with the accompanying drawings, in which—

FIG. 1 is a perspective view of the method for making an elongated structure having channels, according to the invention;

FIG. 2 is a plan view of a portion of the elongated structure as shown in FIG. 1 after it has been cut into rotor frames, according to the invention;

FIG. 3 is an enlarged partially exploded view of a rotor frame of FIG. 2 showing one embodiment of how magnets and pole pieces are positioned in the channels, according to the invention;

DETAILED DESCRIPTION OF THE PREFERRED EMBODIMENT

Figures 4, 5, 6:
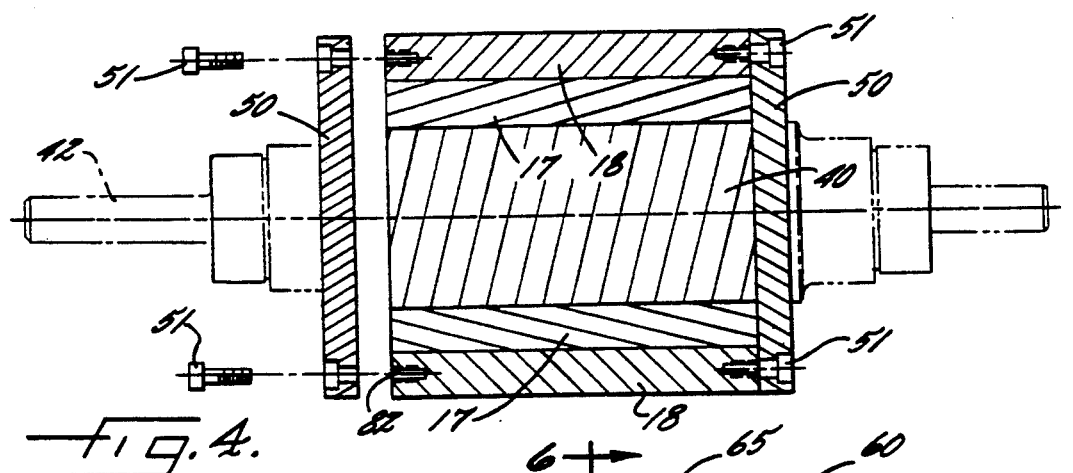
FIG. 4 is a plan view of the rotor frame with magnets and pole pieces in the channels of FIG. 3 having endcaps placed on the ends of the rotor frame, according to the invention.
FIG. 5 is a plan view of a rotary machine with the encased rotor frame with magnets and pole pieces in the channels of FIG. 4 positioned in a conventional annular stator assembly, according to the invention.
FIG. 6 is a cross-sectional view of the rotary machine taken along line 6—6 of FIG. 5 including an electrical driver circuit for the stator assembly.

While the present invention will be described hereinafter with particular reference to the accompanying drawings, it is understood at the outset of this description that persons skilled in the applicable arts will be able to modify the specific arrangements herein described and shown while continuing to achieve the desired result of this invention. Accordingly, the descriptions and illustrations are to be taken as broad, teaching disclosures directed to persons skilled in the appropriate arts, and not as restricting the scope of the present invention.

FIG. 1 illustrates an elongated monolithic generally cylindrical structure 15 being formed by a conventional extrusion machine 20 through die 30. The extrusion machine 20 may be of the conventional type such as made by Sutton Engineering Company. Preferably, a hot or cold drawing process may be employed by the extrusion machine 20. Depending on which extrusion process is used, some machining may be necessary to bring the structure 15 into the proper tolerances.

Extrusion die 30 has a shape such that when the structure 15 is extruded, a series of channels 16 are formed in the outer radial surface portions of the structure 15 parallel to the longitudinal axis 12 thereof. The extrusion die 30 may be made of tool steel. A suitable extrusion die 30 is made by Plymouth Tube Company, having a size of one hundred tons. Different shaped dies may be used to vary the channels 16 (or more particularly the number thereof) and structure 15. The preferred length to extrude the structure 15 is from twelve inches to thirty feet.

Instead of being extruded by conventional extrusion techniques, the elongated structure 15 could instead be formed by forging, or from machined bar stock, stamping, or casting by sand, investment, or dye casting techniques. The structure 15 may be generally cylindrical having outer radial surface portions defining an imaginary circular cylindrical surface 11 (FIG. 3) for the structure.

Preferably, this structure 15 should be a monolithic unitary body made of soft iron, low carbon steel, or any other type of soft ferromagnetic composition having a high magnetic permeability. The structure 15 may have an aperture along axis 12 (not shown) for a shaft to be attached thereto. However, the structure 15 may also be machined down at predetermined places to form the shaft 42 therefrom.

Referring to FIG. 2, the elongated structure 15, after sufficiently cooling, is cut, sliced, or diced at saw points 45, transverse to the longitudinal axis 12, into a plurality of rotor frames 40 of a predetermined length. Conventional cutting techniques, such as bandsaw or horizontal mill with metal slitting saw cutters, as manufactured by LeBlond, Mazak, and Makino corporations, may be used. The length of the cuts are dependent upon the type of rotary machine that is needed for each motor or generator application employing this rotor structure.

FIG. 3 shows a rotor frame 40 having its series of channels 16 formed in the outer radial surface portions of the rotor frame and opening radially outwardly therefrom. Each of the channels 16 extends continuously along the entire length of the rotor frame 40 and opens outwardly from each opposing end of the rotor frame. A magnet 17 is placed into a channel 16. It is well known to those skilled in the art that magnets 17 may each be formed of two or more magnets and that the magnets 17 may be coextensive with the channels. Preferably, a magnetically permeable pole piece 18 may be placed on the outer face 17b of the magnet 17 in each channel 16 with the pole piece 18 having an outer surface being flush with the imaginary circular cylindrical surface 11 defined by the outer radial surface portions of the rotor frame 40. The magnets 17, channels 16, and pole pieces 18 may be releasably attached to each other for convenient assembly and disassembly. Alternatively, the magnets 17 and pole pieces 18 may be placed in each respective channel after forming the structure 15 but before it is cut into individual rotor frames 40.

The channels 16 have side surfaces 16b and a medial surface 16a between the side surfaces The variety of shapes for channels 16, as shown in FIGS. 3 and 7–11, may somewhat change the shape of surfaces 16a and 16b. It will be understood that the terms side and medial are used only for identification purposes to describe the shape variations of channels 16.

Figure 9:
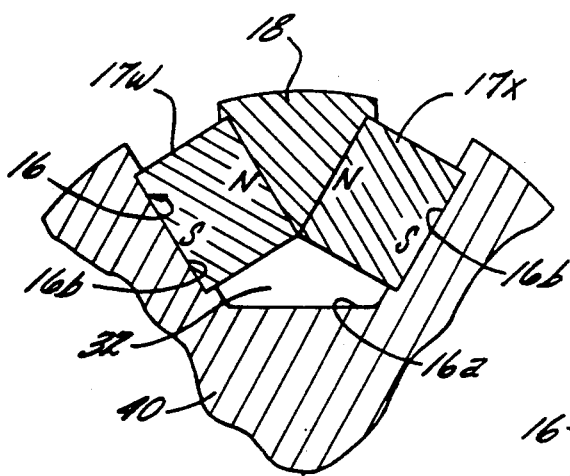
FIG. 9 is an enlarged cross-sectional view of a portion of the rotor frame of FIG. 3 of a fourth embodiment of the invention in which a pair of magnets are placed in each channel.
Figure 11:
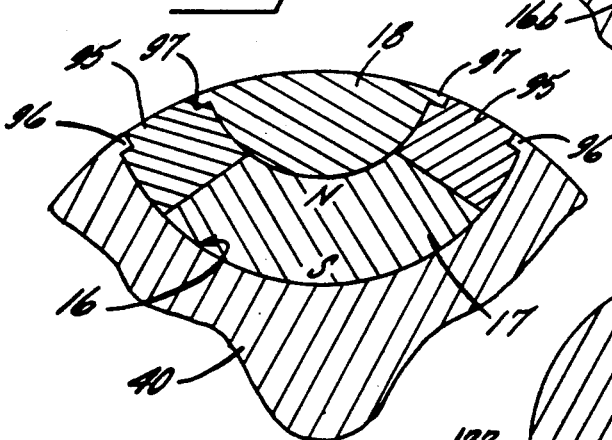
FIG. 11 is an enlarged cross-sectional view of a portion of the rotor frame of FIG. 3 of a sixth embodiment of the invention in which the channels and magnets are snugly held together and non-magnetic covers are attached proximate to the periphery of the rotor frame on the tips of each magnet.

The channels 16 may have enlarged portions 16c proximate to side surfaces 16b. Instead of portions 16c, there may be a variety of other channel 16 shapes as illustrated by FIGS. 3, 9, and 11. Channels 16 may also include overhangs 96, as described below.

The pole pieces 18 may separately be made by an extrusion, lamination or other process. These pole pieces 18 are magnetically permeable and can consist of soft iron, low carbon steel, or any other soft ferromagnetic composition.

The shapes and configurations of the magnets 17 will be discussed with relation to FIGS. 3 and 7 through 11. The magnets 17 may be formed from the known groups of ferrites, rare earth magnets, steel magnets, Alnico, iron-chromium-cobalt, Lodex (electroplated iron-cobalt magnets), or the like. Ferrite and rare earth magnets are produced through a sintering process which forms a homogenous mass by heating without melting. The preferred manner of uniformly magnetizing the magnet 17 is to have different polarities on the inner face 17a and the outer face 17b. In other words, the outer face 17a may have a polarity oriented south and would be placed in contact with the channel 16 to form a magnetically permeable circuit between the channel 26 and the magnet 17. The outer face 17b of the magnet 17 would be magnetically oriented north and would typically be placed in contact with magnetically permeable pole piece 18 to form a magnetically permeable circuit between the magnet 17 and the pole piece 18. Thus, the preferred embodiment has the pole pieces 18 as the north poles and the rotor frame 40 as the south poles. However, the polarities may be just the opposite and still achieve the same machine performance.

An essentially constant field strength, along with use of properly shaped and spaced permeable portions of the rotor results in a more uniform torque, or voltage output, that is virtually free of higher harmonic distortion. Equal north and south pole surface areas along the imaginary circular cylindrical surface 11 defined by outer radial surface portions of the assembled rotor frame 40 are preferred.

Referring now to FIG. 4, the rotor frame 40 with magnets 17 and pole pieces 18 attached thereto (cylindrically shaped in this assembled embodiment) shows the endcaps 50 attached on the opposite ends of the rotor frame 40. The endcaps 50, or endplates, may be attached to the rotor frame 40 (or pole pieces 18) via fasteners 51. Fasteners 51 may be attachingly received by threaded slots 82. The endcaps 50 are made of an essentially non-permeable material. The endcaps 50 allow higher speeds, larger rotor frames 40, and make assembly and disassembly easier. High speed rotors may also require a retaining ring around the circumference of the rotor frame 40. The shaft 42 may be attached to the endcaps 50, inserted and attached to an aperture (not shown) along axis 12 of the rotor frame 40, or machined from the rotor frame 40 as stated previously.

FIG. 5 shows the completed rotor frame 40 from FIG. 4, surrounded by a conventional stator assembly 60 and positioned in the casing 65 of the machine 70. The rotor is supported for rotation by journalled bearings 59 on the shaft 42.

FIG. 6 shows a cross-sectional view of the assembled rotor frame 40 and stator assembly 60. This stator assembly 60 surrounds the rotor frame 40 so that a small air gap 80 is formed therebetween. The air gap 80 may thermally isolate the assembled rotor frame 40 from the stator assembly 60 to minimize the degradation of the magnets 17 With increasing temperatures. Stator teeth 85 are included on the stator and electrical coils 86 (only one shown) may be wound around them. Additionally, an electrical driver circuit 87 is connected to the electrical coils 86 in the manner known to those having skill in the art. A suitable driver circuit 87, as conventionally used in the art may be used for increasing or decreasing the magnetic flux as necessary. This driver circuit 87 may be selectively used to assist in suppressing voltage spikes or surges. Moreover, this driver circuit 87, along with dampening windings may improve starting torque and eliminate unwanted oscillations during load changes. Moreover, the driver circuit 87, by coupling it with an inverter, may lock the rotor frame 40 into synchrony at zero speed and brings the rotor frame 40 up to high speeds as desired. This creates a variable speed rotary machine. Furthermore, the driver circuit 87 may be connected in a single phase or a polyphase arrangement to make it more versatile for a sophisticated application, including co-generation.

Figure 7:
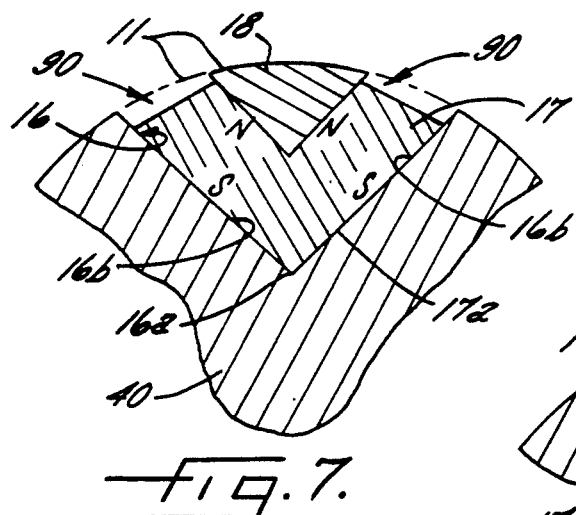
FIG. 7 is an enlarged cross-sectional view of a portion of the rotor frame of FIG. 3 of a second embodiment of the invention in which the channels and magnets are V-shaped.

FIG. 7 is an enlarged cross-sectional view of a portion of the completed rotor frame 40 of FIG. 3. Particularly, the series of channel 16 each has a medial surface 16a at the vertex between side surfaces 16b. The inner face 17a of magnet 17 is against the channel surfaces 16a and 16b. In this embodiment, the channel surfaces 16a and 16b and the inner magnet face 17a are V-shaped and fit together. Two or more magnets may also be employed to form the V-shaped magnet 17. Moreover, pole piece 18 has an outer surface being flush with the imaginary circular cylindrical surface 11 defined by the outer radial surface portions of the rotor frame 40. Air gaps 90 are between the free end portions of the V-shaped magnet 17 opposite the bight portion and the imaginary circular cylindrical surface 11 defined by outer radial surface portions of the rotor frame 40. This is an insulator for leakage flux (i.e. low magnetic permeability and thus no magnetic circuit) and helps to direct the flux through the proper rotor and stator components. Increased energy density results therefrom.

Figure 8:
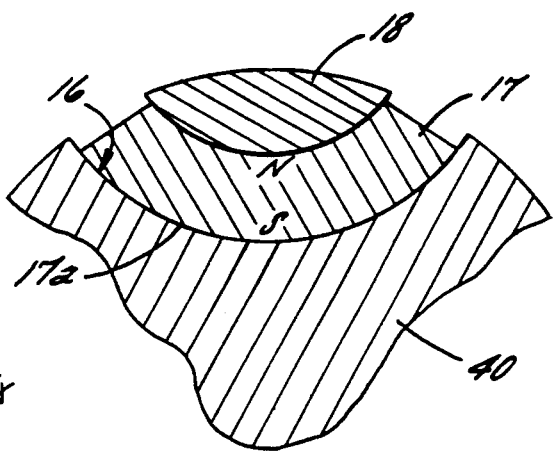
FIG. 8 is an enlarged cross-sectional view of a portion of the rotor frame of FIG. 3 of a third embodiment of the invention in which the channels and magnets are U-shaped.

FIG. 8 is an enlarged cross-sectional view of a portion of the completed rotor frame 40 of FIG. 3. For this embodiment, magnet 17 and the series of channels 16 are U-shaped and the respective surfaces fit as generally illustrated in FIG. 7.

FIG. 9 is an enlarged cross-sectional view of a portion of the completed rotor frame 40 of FIG. 3. A pair of magnets 17w and 17x are respectively placed against side channel surfaces 16b. In particular, instead of solid U-shaped magnets, this embodiment uses two small conventionally shaped bar or rectangular magnets. Thus, an air gap 32 is left adjacent the medial channel surface 16a.

Figure 10:
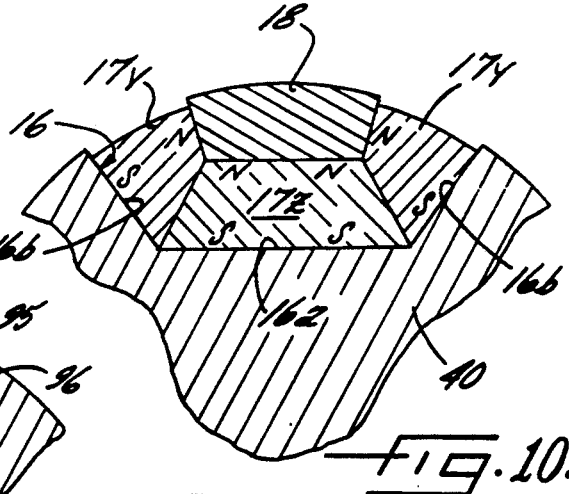
FIG. 10 is an enlarged cross-sectional view of a portion of the rotor frame of FIG. 3 of a fifth embodiment of the invention in which three magnets are placed in each channel.

FIG. 10 is an enlarged cross-sectional view of a portion of the completed rotor frame 40 of FIG. 3 in which three magnets are placed in each channel 16. Namely, two side magnets 17y and a bottom magnet 17z are provided. Bottom magnet 17z lies adjacent the medial channel surface 16a and side magnets 17y lie on the side channel surfaces 16b. Magnets 17y and 17z can be of any shape so long as they fit in channel 16.

FIG. 11 is an enlarged cross-sectional view of a portion of the completed rotor frame 40 of FIG. 3 in which the channel 16, magnet 17, and pole piece 18 are snugly held together and non-magnetic covers 95 are attached between the free end of the magnet 17 and the imaginary circular cylindrical surface 11 defined by the outer radial surface portions of the rotor frame 40. The overhangs 96 of rotor frame 40 and overhangs 97 of pole piece 18 correspondingly fit with the appropriately shaped non-magnetic covers 95, to hold the magnets 17 and covers 95 to the rotor frame 40. Thus, centrifugal force, such as would be present during rotation of the rotor frame 40, will not cause the necessary parts to move and disrupt operation.

These non-magnetic covers 95 may not be needed for slow speed machines. This is because the air gaps 90 are as good an insulator for leakage flux as the non-magnetic covers 95. However, for high speed applications, the non-magnetic covers 95 are preferred to prevent unwanted flux leakage paths or magnetic circuits from occurring and to prevent physical destruction of the rotor structure due to centrifugal force acting thereon. These covers 95 are made of a non-magnetic or low magnetically permeable material, such as aluminum or wood.

Preferably, the magnets 17 may conform to the surface of the channels 16, as shown by the shaped magnets of FIGS. 7, 8, 10, and 11. Since the rotor frame 40 and magnets 17 are in contact, or otherwise form a low reluctance circuit, a solid design With minimal flux leakage is obtained. Therefore, less magnetic material is needed in producing a motor. This results in a less expensive motor.

The rotor frame 40 may also have many different pole configurations. An eight pole rotor design has pole pieces 18 (preferably the north poles or "N-poles") at the 0°, 90°, 180°, and 270° arc degree positions of the rotor frame 40 while the opposite poles (preferably the south poles or "S-poles") are on the outer edges of rotor frame 40 at approximately the 45°, 135°, 225°, and 315° arc degree positions. In a suitable arrangement, as stated previously, the magnets 17 are magnetized such that outer magnet faces 17b against pole pieces 18 have a north ("N") flux orientation, while the inner magnet faces 17a have a south ("S") flux orientation.

A four pole machine, as opposed to an eight pole machine, would have N-poles at the 0° and 180° arc degree positions, while it would have S-poles at the 90° and 270° arc degree positions. As is known to one skilled in the art, a two pole, four pole, eight pole, sixteen pole, thirty-two pole, or other pole configurations may be provided for the interior magnet rotary machine.

Figure 12:
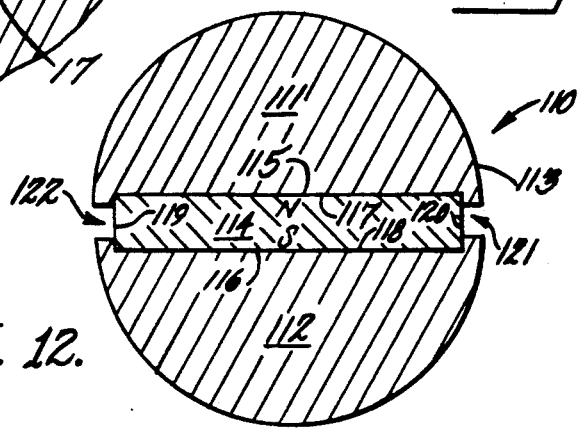
FIG. 12 is a cross-sectional view of a two pole interior magnet rotary machine with a magnet between a pair of rotor frames.

Referring now to FIG. 12, a two pole embodiment of an interior magnet motor is shown. Referring to FIG. 12, the rotor 110 includes an upper and lower rotor frame 111 and 112, respectively, and a magnet 114 therebetween. The periphery 113 of the rotor frames 111 and 112, respectively, is preferably circular, although other periphery shapes may also be formed. In a preferred embodiment, magnet 114 has top and bottom faces 117 and 118, respectively which are polarized of opposite polarity, and which are preferably flat faces. Conforming flat faces 115 and 116, respectively, in upper and lower frames 111 and 112, respectively, form a high permeability magnetic circuit. Magnet 114 also includes sides 119 and 120 which may be recessed from the periphery 113 to form air gaps 121 and 122, respectively. Alternatively, the sides 119 and 120 of magnet 114 may extend out to the periphery 113. The embodiment illustrated in FIG. 12 shows identical upper and lower rotor frames 111 and 112, respectively. However, it Will be understood by those having skill in the art that the rotor frames may be asymmetrical so that one of the frames 111 or 112 can include a bore for a shaft (not shown). Alternatively, endcaps (not shown) may include a shaft thereon.

It will be understood by those having skill in the art that the rotor of FIG. 12 may be formed as was described above with respect to FIGS. 1–5. In other words, a first and second elongated structure may be formed using an extrusion or other process, the structures may be cut into predetermined lengths, and magnets may be placed therebetween to form the rotor. It will be understood by those having skill in the art that while FIG. 12 refers to upper and lower rotor frames, these frames function in the same manner as the rotor frame and pole pieces of the other embodiments.

In operation, the magnetic flux travels from the closest N-pole to the closest S-pole, as illustrated with the two dimensional flux path 100 of FIG. 6. A two dimensional flux path means the flux travels in the plane of the machine transverse to the longitudinal axis 12, not parallel to axis 12. Consequently, the magnetic flux originates in the N-pole of pole piece 18, crosses the gap 80, flows in and out of the stator teeth 85 and the electrical coils 86, crosses the gap 80 again, and arrives at the closest S-pole of rotor frame 40. In effect, the flux interacts with the electrical coils 86 to produce energy (i.e. generator) or the flux from energized coils 86 act on the rotor frame 40 to force rotation (i.e. motor—flux path not shown). The rotor frame 40 rotates from arc degree position to arc degree position within the stationary stator assembly 60 depending on how the motor/generator is operating.

In the drawings and specification, there have been set forth preferred embodiments of the method for mass producing an interior magnet rotary machine and the interior magnet rotary machine produced thereby. This interior magnet machine may be of the permanent magnet salient pole synchronous type, the brushless DC permanent magnet type, or any other motor/generator having a two-dimensional flux path between the rotor frame 40, the gap 80, and the stator 60. The stator assembly 60, associated coils 86, and driver circuit 87 may be of the types that have been known to be used for single, two, and three phase induction and synchronous machines but by no means are they limited to such.

Although specific terms are employed, they are used in a generic and descriptive sense only and not for purposes of limitation, with the scope of the invention being set forth in the following claims.

That which is claimed is:

1. A rotor structure for a rotary machine comprising:
   a rotor frame comprising a monolithic unitary body of magnetically permeable material having an elongate generally cylindrical shape with outer radial surface portions defining an imaginary circular cylindrical surface of said rotor frame, said rotor frame including a series of channels formed in the outer radial surface portions of said rotor frame and opening radially outwardly therefrom, each of said channels extending continuously along an entire length of said rotor frame and opening outwardly from each opposing end of said rotor frame; and
   at least one magnet positioned in each of said channels, each of said magnets having a predetermined shape so as not to protrude radially outwardly beyond the imaginary circular cylindrical surface defined by the outer radial surface portions of said rotor frame.

2. The rotor structure according to claim 1 wherein said at least one magnet includes an inner surface and an outer surface opposite said inner surface, said inner magnet surface received against said each said channel, and further comprising at least one pole piece coextensively placed on said outer surface of said magnet.

3. The rotor structure according to claim 1 further comprising at least one endcap placed on at least one end of the rotor frame.

4. The rotor structure according to claim 1 wherein said at least one magnet has a predetermined shape conforming to a surface of said each of said channels.

5. The rotor structure according to claim 1 wherein said channels and said at least one magnet are V-shaped.

6. The rotor structure according to claim 1 wherein said channels and said at least one magnet are U-shaped.

7. The rotor structure according to claim 1 wherein each of said channels has a pair of opposing side surface portions and a medial surface portion located therebetween, and wherein said at least one magnet includes a pair of magnets positioned in each channel, with each one of said pair of magnets lying along a respective opposing side surface portion of the channel, said pair of magnets separated from the medial surface portion of said channel to form an air gap therebetween.

8. The rotor structure according to claim 1 wherein each of said channels has a pair of opposing side surface portions and a medial surface portion located therebetween, and wherein said at least one magnet includes three magnets in each channel, with a first magnet lying on the medial surface portion of said channel and the other two magnets lying on the respective side surface portions of each channel.

9. The rotor structure according to claim 1 wherein said at least one magnet includes an inner surface and an outer surface with opposite polarities, with said inner magnet surface positioned against said each of said channels.

10. The rotor structure according to claim 1 further comprising means for holding said at least one magnet in each of said channels.

11. The rotor structure according to claim 2 further comprising at least one endcap placed on at least one end of the rotor frame.

12. The rotor structure according to claim 2 wherein said at least one magnet has a predetermined shape conforming to a surface of said each of said channels.

13. The rotor structure according to claim 2 wherein said channels and said at least one magnet are U-shaped.

14. The rotor structure according to claim 2 wherein each of said channels has a pair of opposing side surface portions and a medial surface portion located therebetween, and wherein said at least one magnet includes a pair of magnets positioned in each channel, with each one of said pair of magnets lying along a respective opposing side surface portion of the channel, said pair of magnets separated from the medial surface portion of said channel to form an air gap therebetween.

15. The rotor structure according to claim 2 wherein said at least one magnet includes an inner surface and an outer surface with opposite polarities, with said inner magnet surface positioned against said each of said channels.

16. The rotor structure according to claim 2 wherein said at least one magnet has predetermined portions recessed from the imaginary circular cylindrical surface defined by the outer radial surface portions of said rotor frame to form an air gap of low magnetic permeability.

17. The rotor structure according to claim 16 further comprising a non-magnetically permeable cover in said air gap.

18. The rotor structure according to claim 2 wherein said at least one magnet has predetermined portions generally aligned with the imaginary circular cylindrical surface defined by the outer radial surface portions of said rotor frame.

19. The rotor structure according to claim 2 wherein said at least one pole piece has an outer surface generally aligned with the imaginary circular cylindrical surface defined by the outer radial surface portions of said rotor frame.

20. A rotary machine comprising:
    a rotor frame comprising a monolithic unitary body of magnetically permeable material having an elongate generally cylindrical shape with outer radial surface portions defining an imaginary circular cylindrical surface of said rotor frame, said rotor frame including a series of channels formed in the outer radial surface portions of said rotor frame and opening radially outwardly therefrom, each of said channels extending continuously along an entire length of said rotor frame and opening outwardly from each opposing end of said rotor frame; and
    at least one magnet positioned in each of said channels, each of said magnets having a predetermined shape so as not to protrude radially outwardly beyond the imaginary circular cylindrical surface defined by the outer radial surface portions of said rotor frame; and
    a stator assembly surrounding said rotor frame with said at least one magnet in said channels, to thereby form a rotary machine.

21. The rotary machine according to claim 20 wherein said at least one magnet includes an inner surface and an outer surface opposite said inner surface, said inner magnet surface received against said each of said channels, and further comprising at least one pole piece coextensively placed on said outer surface of said magnet.

22. The rotary machine according to claim 20 further comprising at least one endcap placed on at least one end of the rotor frame.

23. The rotary machine according to claim 20 wherein said at least one magnet has a predetermined shape conforming to the surface of said channels.

24. The rotary machine according to claim 20 wherein said channels and said at least one magnet are V-shaped.

25. The rotor machine according to claim 20 wherein said channels and said at least one magnet are U-shaped.

26. The rotary machine according to claim 20 wherein each of said channels has a pair of opposing side surface portions and a medial surface portion located therebetween, and wherein said at least one magnet includes a pair of magnets positioned in each channel, with each one of said pair of magnets lying along a respective opposing side surface portion of the channel, said pair of magnets separated from the medial surface portion of said channel to form an air gap therebetween.

27. The rotary machine according to claim 20 wherein each of said channels has a pair of opposing side surface portions and a medial surface portion located therebetween, and wherein said at least one magnet includes three magnets in each channel, with a first magnet lying on the medial surface portion of said channel and the other two magnets lying on the respective side surface portions of each channel.

28. The rotor structure according to claim 20 wherein said at least one magnet includes an inner surface and an outer surface with opposite polarities, with said inner magnet surface positioned against the channel.

29. The rotary machine according to claim 21 wherein said at least one magnet has predetermined portions generally aligned with the imaginary circular cylindrical surface defined by the outer radial surface portions of said rotor frame.

30. The rotor structure according to claim 21 wherein said at least one pole piece has an outer surface generally aligned with the imaginary circular cylindrical surface defined by the outer radial surface portions of said rotor frame.

31. The rotary machine according to claim 20 further comprising means for holding said at least one magnet in each of said channels.

32. The rotary machine according to claim 20 further comprising an electrical driver circuit connected to said stator assembly.

33. A rotor structure for a rotary machine comprising:
a rotor frame comprising a monolithic unitary body of magnetically permeable material having an elongate generally cylindrical shape with outer radial surface portions defining an imaginary circular cylindrical surface of said rotor frame, said rotor frame including a series of generally U-shaped channels formed in the outer radial surface portions of said rotor frame and opening radially outwardly therefrom, each of said channels extending continuously along an entire length of said rotor frame and opening outwardly from each opposing end of said rotor frame;
at least one generally U-shaped magnet positioned in each of said generally U-shaped channels so as not to protrude radially outwardly beyond the imaginary circular cylindrical surface defined by the outer radial surface portions of said rotor frame, each of said U-shaped magnets having an inner surface adjacent said channel magnetized at a first polarity and an outer surface opposite said inner surface magnetized at an opposite polarity; and
a pole piece mounted on the outer surface of each of said U-shaped magnets, each of said pole pieces having an inner surface adjacent the outer surface of said U-shaped magnet and conforming thereto to form a high permeability magnetic circuit, each of said pole pieces having an outer surface opposite said inner surface being flush with the imaginary circular cylindrical surface defined by the outer radial surface portions of said rotor frame.

34. The rotor structure of claim 33 wherein each of said generally U-shaped magnets includes free end portions opposite a bight portion, and wherein the free end portions of said U-shaped magnets are recessed from the imaginary circular cylindrical surface defined by the outer radial surface portions of said rotor frame to form air gaps of low magnetic permeability adjacent the free end portions of said U-shaped magnets.

35. The rotor structure of claim 34 further comprising a non-permeable cover positioned within each recess adjacent said free end portions of said U-shaped magnets.

36. A rotor structure for a rotary machine comprising:
a rotor frame comprising a monolithic unitary body of magnetically permeable material having an elongate generally cylindrical shape with outer radial surface portions defining an imaginary circular cylindrical surface of said rotor frame, said rotor frame including a series of channels formed in the outer radial surface portions of said rotor frame and opening radially outwardly therefrom, each of said channels extending continuously along an entire length of said rotor frame and opening outwardly from each opposing end of said rotor frame, each of said channels having a pair of opposing side surface portions and a medial surface portion located therebetween;
a pair of bar magnets positioned in each channel, each one of said bar pair of magnets lying along a respective opposing side surface portion of said channel, each of said bar magnets having a first surface adjacent a respective side surface portion of said channel magnetized at a first polarity and a second surface opposite said first surface magnetized at an opposite polarity; and
a generally triangular pole piece mounted between the second surfaces of the bar magnets in each pair thereof to form a high permeability magnetic circuit, an outer surface of each pole piece being flush with the imaginary circular cylindrical surface defined by the outer radial surface portions of said rotor frame.

37. The rotor structure of claim 36 wherein each of said bar magnets includes a third surface between said first and second surfaces being recessed from the imaginary circular cylindrical surface defined by the outer radial surface portions of said rotor frame to form air gaps of low magnetic permeability.

38. The rotor structure of claim 37 further comprising a non-permeable cover positioned within a recess adjacent said third surfaces of said bar magnets.

39. A rotor structure for a rotary machine comprising:
a rotor frame comprising a monolithic unitary body of magnetically permeable material having an elongate generally cylindrical shape with outer radial surface portions defining an imaginary circular cylindrical surface of said rotor frame, said rotor frame including a series of generally V-shaped channels formed in the outer radial surface portions of said rotor frame and opening radially outwardly therefrom, each of said channels extending continuously along an entire length of said rotor frame and opening outwardly from each opposing end of said rotor frame; and at least one generally V-shaped magnet positioned in each of said generally V-shaped channels, each of said V-shaped magnets having an inner surface adjacent said channel magnetized at a first polarity and an outer surface opposite said inner surface magnetized at an opposite polarity; and a pole piece mounted on the outer surface of each of said U-shaped magnets, each of said pole pieces having an inner surface adjacent the outer surface of said V-shaped magnet and conforming thereto to form a high permeability magnetic circuit, each of said pole pieces having an outer surface opposite said inner surface being flush with the imaginary circular cylindrical surface defined by the outer radial surface portions of said rotor frame.

40. The rotor structure of claim 39 wherein each of said generally V-shaped magnets includes free end portions opposite a bight portion, and wherein the free end portions of said V-shaped magnets are recessed from the imaginary circular cylindrical surface defined by the outer radial surface portions of said rotor frame to form air gaps of low magnetic permeability adjacent the free end portions of said V-shaped magnets.

41. The rotor structure of claim 40 further comprising a non-permeable cover positioned within each recess adjacent said free end portions of said V-shaped magnets.

42. A rotor structure for a rotary machine comprising:

a rotor frame comprising a monolithic unitary body of magnetically permeable material and having an elongate generally cylindrical shape with outer radial surface portions defining an imaginary circular cylindrical surface of said rotor frame, said rotor frame including a series of channels formed in the outer radial surface portions of said rotor frame and opening radially outwardly therefrom, each of said channels extending continuously along the entire length of said rotor frame and opening outwardly from each opposing end of said rotor frame, each of said channels having a pair of opposing side surface portions and a medial surface portion located therebetween; and three magnets mounted in each channel, a first magnet lying on the medial surface portion of said channel and the second and third magnets lying on respective side surface portions of each channel, each of said magnets having an inner surface adjacent said channel magnetized at a first polarity and an outer surface opposite said inner surface magnetized at an opposite polarity; and a pole piece mounted on an outer surface of each of said magnets, each of said pole pieces having an inner surface adjacent the outer surface of said magnets and conforming thereto to form a high permeability magnetic circuit, each of said pole pieces having an outer surface opposite said inner surface being flush with the imaginary circular cylindrical surface defined by the outer radial surface portions of said rotor frame.

43. The rotor structure of claim 42 wherein a predetermined portion of each of said second and third magnets is recessed from the imaginary cylindrical surface defined by the outer radial surface portions of said rotor frame to form air gaps of low magnetic permeability adjacent to the predetermined portions of said second and third magnets.

44. The rotor structure of claim 43 further comprising a non-permeable cover positioned within each recess adjacent said predetermined portions of said second and third magnets respectively.

* * * * *